March 30, 1937.  W. C. OSTERHOLM  2,075,130

CLUTCH

Filed March 16, 1931

INVENTOR
William C. Osterholm.
BY
Harness, Dickey, Pierce & Hann
ATTORNEYS.

Patented Mar. 30, 1937

2,075,130

UNITED STATES PATENT OFFICE 2,075,130

CLUTCH

William C. Osterholm, Oak Park, Ill.

Application March 16, 1931, Serial No. 522,943

17 Claims. (Cl. 192—41)

This invention relates to clutch mechanisms and has particular relation to a clutch of the one way type, wherein a driving member rotates a driven member in one direction but freely rotates in the other direction.

One object of the invention is to provide a clutch mechanism of simple and inexpensive construction wherein the area of driving engagement between the driving and driven members may be greatly increased and evenly distributed.

Another object of the invention is to provide a clutch mechanism of the type described wherein back lash or take up is substantially eliminated.

Another object of the invention is to provide a clutch mechanism for connecting rotating members, which cushions the driving connection and thereby graduates changes in torsional strain.

For a better understanding of the invention reference will now be had to the accompanying drawing forming a part of the specification wherein.

Figure 2:
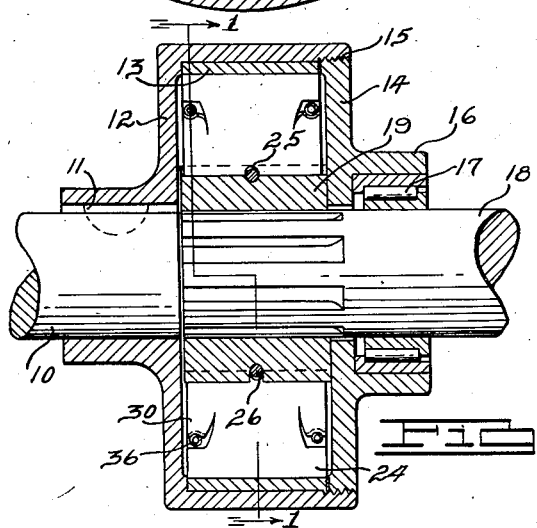
Fig. 2 is a longitudinal cross sectional view of the construction shown by Fig. 1.

Referring to Fig. 2, a shaft 10 is provided, which is keyed as indicated at 11 to a cup shaped casing member 12 which is provided with a lining 13 of suitable, hardened material. A cover plate 14 threaded as indicated at 15, is provided to close the open end of the casing 12. The plate 14 is provided with hub 16 which may contain roller bearings 17 permitting free rotation of a second shaft 18.

A hub member 19 is fitted to the splined end of the shaft 18, and is of such axial length that it fits closely between the casing 12 and the plate 14 although it is rotatable with respect to both members.

Figure 3:
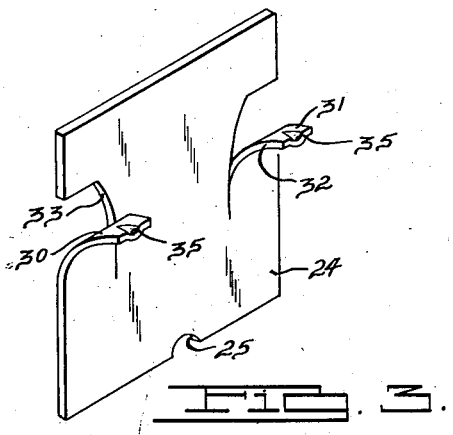
Fig. 3 is a perspective view of one of the blades or driving members utilized in the construction shown by Figs. 1 and 2.
Figure 5:
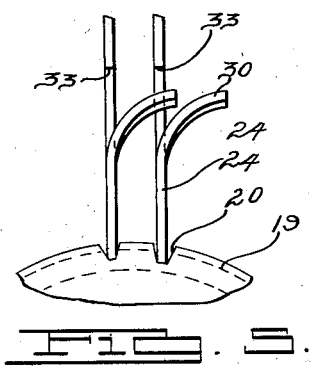
Fig. 5 is a fragmentary elevational view of two blades illustrating their relation to one another and to the hub to which they are mounted.

As best shown by Fig. 5, the hub member 19 is provided with a series of equally spaced, axially extending grooves 20, the sides of which converge toward the base thereof. A blade 24 substantially rectangular in shape as best shown by Fig. 3, is disposed in each of the grooves 20 and owing to the fact that the grooves are of V-shape, a limited rocking movement of each blade in its groove is permitted. The edges of the blades 24 which rest in the grooves 20, are provided with centrally disposed notches 25 as best shown by Figs. 2 and 3 which engage a round wire 26 disposed in a circumferential groove in the hub member 19, thus preventing displacement of the blades axially of the hub.

Figure 1:
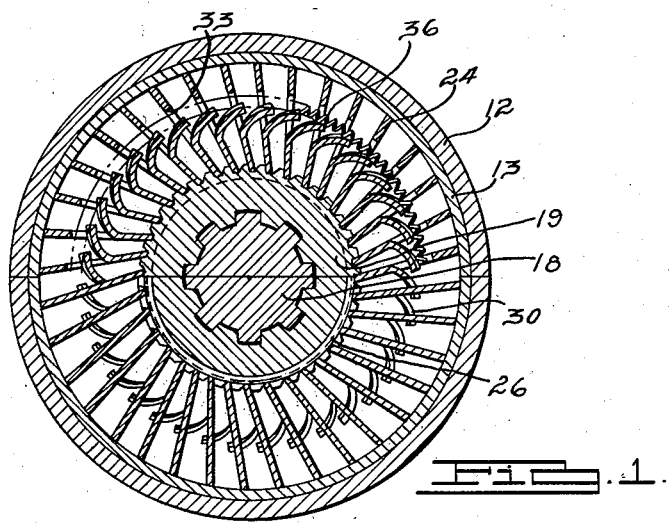
Fig. 1 is a transverse cross sectional view taken substantially along the line 1—1 of Fig. 2, of a clutch mechanism constructed according to one form of the invention.

The length of each of the blades 24 is greater than the radial distance between the lining 13 and the periphery of the hub 19, and accordingly all of the blades necessarily must be tilted with respect to radial planes intersecting the grooves 20 of the hub member 19. From this description it is apparent that if the hub member 19 as shown by Fig. 1 is rotated in a counter-clockwise direction, each blade will be urged toward a position coinciding with a radial plane passing through its groove 20, or in other words, each blade and a part of the hub member 19 constitute a toggle, and when the hub member 19 is rotated in the direction stated the parts of the toggle will be urged toward positions of radial alignment. Necessarily this will force the outer edge of each blade against the inner peripheral surface of the lining 13, and the amount of this force will depend upon the resistance of the cup casing 12 and shaft 10 to rotation. The wedging engagement of the blades between the lining 13 and the hub 19 constitutes the operative connection between the shaft 10 and the shaft 18 and effectively serves to rotate one by rotating the other. It is likewise apparent that if the hub member 19 were rotated in a clockwise direction as shown by Fig. 1, the blades 24 would not be urged against the lining 13 but that the hub member and blades would freely rotate with respect to the cup member 12.

As best shown by Figs. 3 and 5, each of the blades 24 is provided with lips or tongues 30 and 31 stamped from opposite edges thereof and bent about their lower edges into arcuate form. The inner edge of each lip, indicated at 32, is tapered toward the upper end of the lip and accordingly such end of the lip progressively decreases in width. Slots 33 formed in each end of the blade 24 by stamping the lips 30 and 31 from the blades, are complementary to the lip and accordingly decrease in width toward their upper ends.

The free end of each of the lips 30 and 31 is provided with a shallow groove 35 and this grooved portion of the blade 24 is so removed from the body of the latter, that it is disposed on a side of a radial plane intersecting the edge of the blade positioned in the groove 20 in the hub member 19, opposite that side on which the body of the blade is arranged.

For the purpose of urging the blades toward positions coinciding with radial planes, contractile elements such as circumferentially extending helical springs 36, are threaded through the slots 33, and engage the base of the grooves 35 in the lips 30 and 31. Owing to the fact that the end of each tongue containing the groove 35 and the body of the blade are located on opposite sides of a radial plane intersecting the edge of the blade disposed in the groove 20 in the hub 19, the pressure of the contractile elements on the ends of the tongues, urges the blade toward a position coinciding with the radial plane normal to the groove.

The tapering shape of the slot 33 and lip 30 in the blade 24, is such that the lip on one blade may freely move through the slot 33 in an adjacent blade, without interfering contact with such adjacent blade. Constructing the lips 30 and the slots 33 in this manner permits the use of a larger number of blades because they can be placed close together and accordingly the area of engagement between the driving and driven members may be increased considerably.

Figure 4:
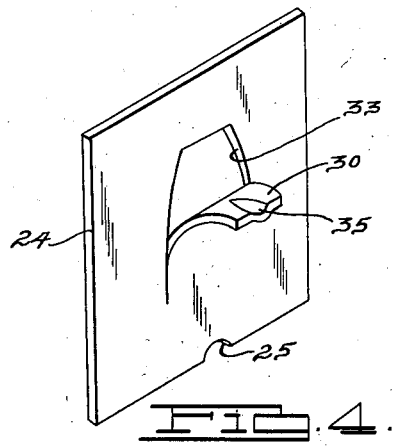
Fig. 4 is a perspective view of another type of blade that may be employed.

Fig. 4 discloses a construction similar to that shown by Fig. 3, with the exception that only one lip 30 is provided and it is located centrally of the side edges of the blade. Consequently, only one circumferentially extending contractile element is necessary.

Preferably the blades 24 are constructed from sheet metal and may be easily and inexpensively manufactured as stampings. The blades being relatively thin they may flex slightly upon driving engagement and cushion somewhat the shock of engagement between the driving and driven members. It is apparent that the blades may be used until their length is substantially equal to the radial distance between the periphery of the hub member 19 and the bearing member 13 because until the blade length has been decreased to this extent, the edges thereof will have a very forceful contact with the hub member and the cup member. Also it is apparent that any or all of the blades may be readily removed from the clutch mechanism and new ones substituted therefor.

Owing to the fact that the outer edges of the blades 24 always are maintained in contact with the cup member 12 when the latter is rotating clockwise as shown in Fig. 1, the back lash or play between the outer edges of the blades and the cup member, when the direction of rotation of the cup member is reversed, is substantially eliminated. This is evident from the fact, that as soon as the direction of rotation of the hub member 19 is reversed, the blades are wedged between the hub and the cup member.

The edges of the blades 24 may be shaped as found most desirable, as shown by Fig. 5, their outer edges may be beveled or slightly rounded.

The clutch mechanism described above provides a very efficient means for connecting a driving shaft to a driven shaft. Also it provides a means for eliminating back lash between the driving and driven members upon engagement of the clutch. Also the clutch mechanism constitutes a cushion connection between one shaft and another and changes in torsional strain occurring upon engagement and when a greater load is imposed may be graduated without unduly straining the connection. Moreover, the clutch mechanism is of very simple and inexpensive construction, and may be manufactured without involving much time or labor. Additionally, repairs on the clutch may be readily made because the parts may be disassembled quickly and replaced with new parts if this should be necessary. Should any of the blades break or become deformed, obviously new ones could be substituted at a small cost.

Although only one form of the invention has been described and illustrated in detail, it will be apparent that the invention may be modified in various ways without departing from the scope of the attached claims.

I claim:

1. A clutch for transmitting rotary movement of one shaft to another, which comprises outer and inner cylindrical members secured respectively to the shafts, blades disposed between the members and fulcruming about one member, each blade having a stamped out portion, bent arcuately about an axial side, the end of each projection being tapered and adapted to project into the opening in an adjacent blade resulting from forming a projection.

2. A clutch for transmitting rotary movement of one shaft to another, which comprises outer and inner cylindrical members secured respectively to the shafts, blades disposed between the members and fulcruming about one member, each blade having a stamped out portion, bent arcuately about an axial side, the end of each projection being tapered and adapted to project into the opening in an adjacent blade resulting from forming a projection and contractile means extending circumferentially through the openings in the blades and contacting with the projections.

3. A clutch for transmitting rotary movement of one shaft to another, which comprises outer and inner cylindrical members secured respectively to the shafts, blades disposed between the members and fulcruming about one member, each blade having a stamped out portion, bent arcuately about an axial side, the end of each projection being tapered and adapted to project into the opening in an adjacent blade resulting from forming a projection each blade being disposed on one side of a radial plane intersecting one of its ends, contractile means extending circumferentially through the openings in the blades and contacting with the projections the portions of the projections engaging the contractile means being on the opposite side of the respective planes.

4. A clutch for transmitting rotary movement of one shaft to another, which comprises outer and inner cylindrical members secured respectively to the shafts, blades disposed between the members and fulcruming about one member, each blade having a stamped out portion, bent arcuately about an axial side, the end of each projection being tapered and adapted to project into the opening in an adjacent blade resulting from forming a projection and contractile means extending circumferentially through the openings in the blades and contacting with the projections, said openings and projections being located axially midway between the ends of the blade.

5. A clutch for transmitting rotary movement of one shaft to another, which comprises outer and inner members secured respectively to the shafts, and blades disposed between the members and fulcruming about one member, each blade having a circumferentially directed projection and an opening therein adjacent the projection.

6. A clutch for transmitting rotary movement of one shaft to another, which comprises outer and inner members secured respectively to the shafts, and blades disposed between the members and fulcruming about one member, each blade having a circumferentially directed projection and an opening therein adjacent the projection, the projection on one blade being adapted to project into the opening in an adjacent blade.

7. A clutch for transmitting rotary movement of one shaft to another which comprises outer and inner members secured respectively to the shafts, blades disposed between the members and fulcruming about one member, each blade having a circumferentially directed projection and an opening therein adjacent such projection, and resilient means extending through such openings and engaging the projections for moving the blades.

8. A clutch for transmitting rotary movement of one shaft to another which comprises outer and inner members secured respectively to the shafts, blades disposed between the members in position offset with respect to radii, a projection extending from each blade circumferentially beyond a radius intersecting one end of the blade, each blade also having an opening adjacent the projection, and resilient means passing circumferentially through the openings, and engaging the free ends of the projections for biasing the blades toward radial position.

9. A clutch for transmitting rotary movement of one shaft to another, which comprises outer and inner members secured respectively to the shafts, blades disposed between the members in offset positions respectively with respect to radii intersecting one end of the blades, a projection extending from each blade circumferentially and beyond the radius intersecting one end of the blade, each blade having an opening adjacent the projection, and resilient means passing through the openings circumferentially and engaging the free ends of the projections for biasing the blades toward radial positions.

10. A clutch for transmitting rotary movement of one shaft to another which comprises outer and inner cylindrical members secured respectively to the shafts, blades disposed between the members and fulcruming about one member, each blade normally being offset with respect to a radius intersecting one end thereof, each blade also having a projection extending circumferentially and which is arcuate between its free end and its point of attachment to the blade, each blade also having an opening adjacent the projection, and resilient means passing through the openings and engaging the free ends of the projections for biasing the blades toward radial positions.

11. In a clutch for transmitting rotary movement of one shaft to another, outer and inner members secured respectively to the shafts, and a blade positioned between the members, said blade having a plane body portion, and a circumferentially extending projection stamped out of the body portion.

12. In a clutch for transmitting rotary movement of one shaft to another, outer and inner members secured respectively to the shafts, and a blade disposed between the members, said blade having a plane body portion, and an opening in the body portion, and a projection extending circumferentially from the body portion adjacent the opening.

13. A clutch for transmitting rotary movement of one shaft to another, which comprises outer and inner members secured respectively to the shafts, and blades disposed between the members and fulcruming about one member, each blade having a stamped out projection bent about one side, the end of each projection being adapted to project into an opening in an adjacent blade resulting from forming a projection therein.

14. A clutch for transmitting rotary movement of one shaft to another, which comprises outer and inner members secured respectively to the shafts, blades disposed between the members and fulcruming about one member, each blade having a circumferentially directed projection tapering toward its free end, and an opening adjacent the projection.

15. A clutch for transmitting rotary movement of one shaft to another which comprises outer and inner members, secured respectively to the shafts, one of such members having axially directed grooves substantially V shape in cross section, and blades disposed between the members and having one end fulcrumed in such grooves, whereby the diverging sides of the grooves serve as limiting means to limit fulcruming movement of the blades.

16. A clutch for transmitting rotary movement from one shaft to another comprising radially spaced outer and inner members, a circumferentially arranged series of spoke-like elements between the members and pivoted at one end on one member, each of the spoke-like elements being of greater length than the radial distance between the members so that its end opposite its pivot will engage the other member at a point at one circumferential side of a radius of the members passing through the pivot, an annular helical spring of radially contractile character for uniformly moving the elements in a pivotal manner, and means on each of the elements and disposed at the circumferentially opposite side of said radius for engaging the inner periphery of the spring, so that the spring urges the elements toward radial position.

17. A clutch for transmitting rotary movement of one shaft to another which comprises outer and inner members secured respectively to the shafts, blades disposed between the members in offset positions with respect to radii respectively intersecting similar ends of the blade, means projecting from each blade circumferentially beyond the opposite side of the radius intersecting the end of the blade, each blade having an opening adjacent the projecting means, and resilient means passing circumferentially through the openings and engaging said projecting means for biasing the blades toward radial positions.

WILLIAM C. OSTERHOLM.